United States Patent
Wright

(10) Patent No.: US 11,909,279 B1
(45) Date of Patent: Feb. 20, 2024

(54) PRIME MOVER WITH INTEGRAL DRIVERS FOR PROVIDING MULTIPLE MODES OF LOCOMOTION

(71) Applicant: Charles Scott Wright, Cleveland, TN (US)

(72) Inventor: Charles Scott Wright, Cleveland, TN (US)

( * ) Notice: Subject to any disclaimer, the term of this patent is extended or adjusted under 35 U.S.C. 154(b) by 235 days.

(21) Appl. No.: 17/474,618

(22) Filed: Sep. 14, 2021

Related U.S. Application Data

(60) Provisional application No. 63/079,168, filed on Sep. 16, 2020.

(51) Int. Cl.

| | |
|---|---|
| *H02K 16/02* | (2006.01) |
| *B60F 5/02* | (2006.01) |
| *B60B 19/02* | (2006.01) |
| *B64C 11/48* | (2006.01) |
| *B64D 27/24* | (2006.01) |
| *H02K 7/14* | (2006.01) |
| *B64C 37/00* | (2006.01) |
| *H02K 21/12* | (2006.01) |
| *H02K 7/00* | (2006.01) |
| *H02K 21/02* | (2006.01) |
| *H02K 1/02* | (2006.01) |
| *H02K 7/06* | (2006.01) |

(52) U.S. Cl.
CPC .......... *H02K 16/02* (2013.01); *B60B 19/02* (2013.01); *B60F 5/02* (2013.01); *B64C 11/48* (2013.01); *B64C 37/00* (2013.01); *B64D 27/24* (2013.01); *H02K 7/006* (2013.01); *H02K 7/14* (2013.01); *H02K 21/023* (2013.01); *H02K 21/12* (2013.01); *H02K 1/02* (2013.01); *H02K 7/06* (2013.01)

(58) Field of Classification Search
CPC . B60F 5/02; B64C 37/00; B64C 11/48; B64U 60/70; B64U 10/70; B60B 19/02
See application file for complete search history.

(56) References Cited

U.S. PATENT DOCUMENTS

| | | | | |
|---|---|---|---|---|
| 5,442,250 | A | * 8/1995 | Stridsberg | ............... B60L 50/60 310/67 R |
| 9,364,766 | B2 | 6/2016 | Mielniczek | |
| 9,598,171 | B2 | 3/2017 | Olm et al. | |
| 2003/0230946 | A1* | 12/2003 | Durham | ................. H02K 21/44 310/156.17 |

(Continued)

*Primary Examiner* — Joshua J Michener
*Assistant Examiner* — Arfan Y. Sinaki
(74) *Attorney, Agent, or Firm* — Knox Patents; Thomas A. Kulaga

(57) ABSTRACT

Apparatus for a motive device that combines a prime mover integrated with one or more drivers for multimodal locomotion. The motive device has an axle configured to connect to a vehicle and has a ground configuration for land travel and a fan configuration for lift and flight. The motive device includes a prime mover integrated with a ground driver and a fan driver. The motive device includes a multitude of stator windings attached to the axle and a multitude of magnets attached to rotors. The ground driver includes a wheel with the spokes extending from at least one rotor. The wheel rotates for land-based locomotion when in the ground configuration. The fan driver includes blades extending from another rotor. The blades rotate for lift and flight when in the fan configuration.

20 Claims, 7 Drawing Sheets

(56) References Cited

U.S. PATENT DOCUMENTS

| | | | |
|---|---|---|---|
| 2004/0212259 A1* | 10/2004 | Gould | H02K 7/14 |
| | | | 310/67 R |
| 2007/0284939 A1 | 12/2007 | Charles et al. | |
| 2008/0048065 A1* | 2/2008 | Kuntz | B60F 5/02 |
| | | | 244/17.23 |
| 2014/0061362 A1* | 3/2014 | Olm | B64C 37/00 |
| | | | 244/2 |
| 2014/0225550 A1* | 8/2014 | Tchervenkov | H02P 29/60 |
| | | | 318/473 |
| 2016/0118849 A1* | 4/2016 | Popov | H02K 1/148 |
| | | | 310/67 R |
| 2016/0272314 A1 | 9/2016 | Radu | |
| 2018/0029431 A1 | 2/2018 | Tang et al. | |
| 2018/0281537 A1* | 10/2018 | Leppo | B60F 3/0061 |
| 2020/0023701 A1* | 1/2020 | Salem | B60F 5/02 |
| 2022/0332413 A1* | 10/2022 | Rallings | B64U 10/13 |

* cited by examiner

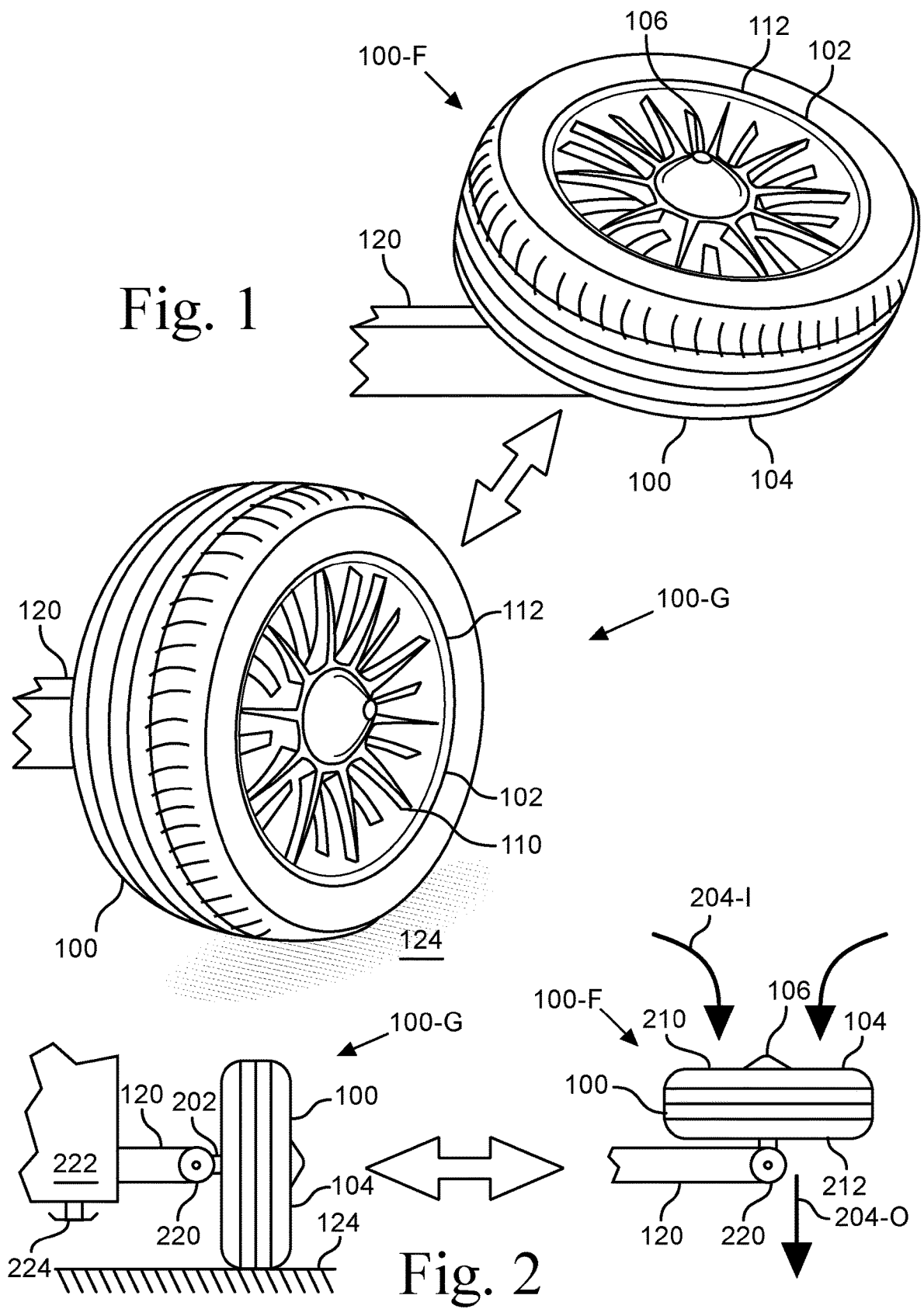

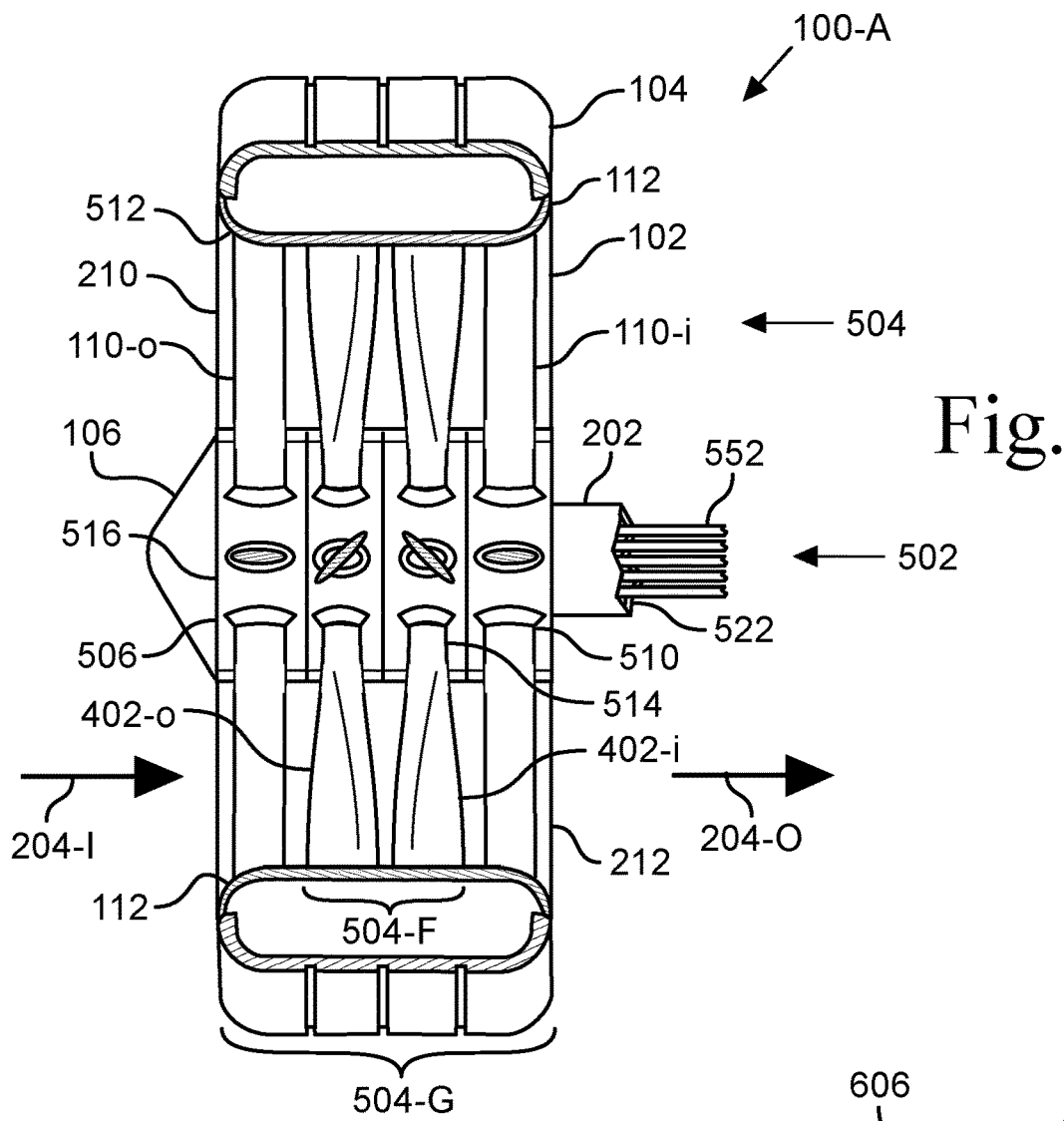
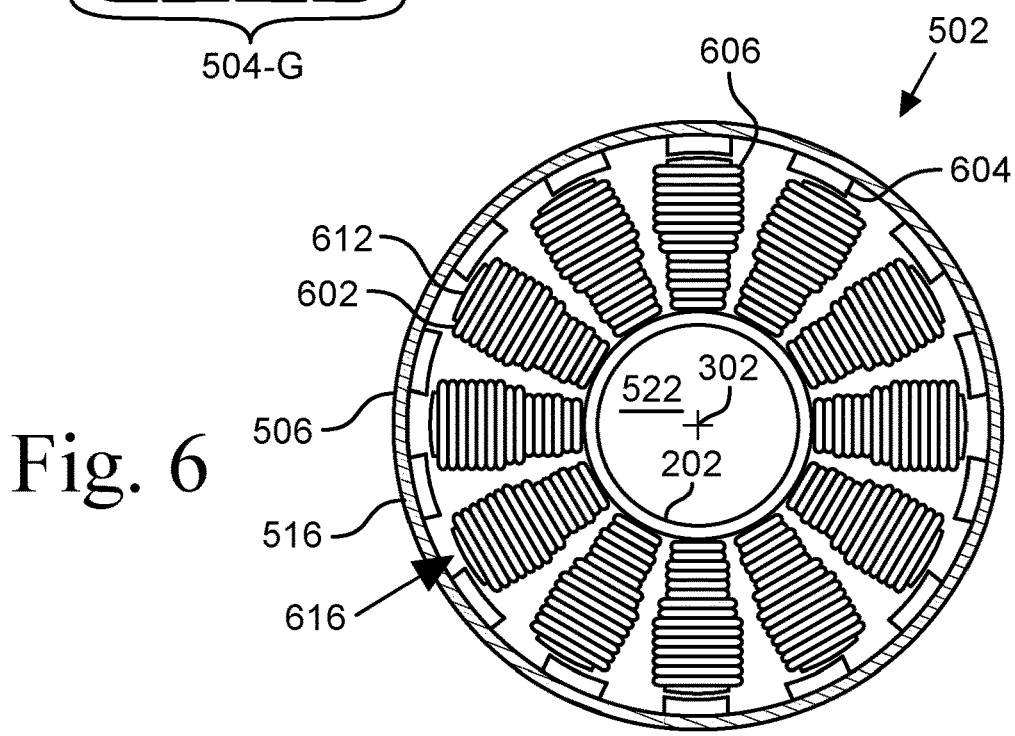

PRIME MOVER WITH INTEGRAL DRIVERS FOR PROVIDING MULTIPLE MODES OF LOCOMOTION

CROSS-REFERENCE TO RELATED APPLICATIONS

This application claims the benefit of U.S. Provisional Application No. 63/079,168, filed Sep. 16, 2020.

STATEMENT REGARDING FEDERALLY SPONSORED RESEARCH OR DEVELOPMENT

Not Applicable

BACKGROUND

1. Field of Invention

This invention pertains to a motive device configured for a vehicle. More particularly, this invention pertains to a device that includes a prime mover converting electrical energy into mechanical energy with that mechanical energy coupled to a driver for land-based locomotion and a fan for air-based locomotion.

2. Description of the Related Art

As the population increases, so too does the congestion on roadways. With the road-based vehicles currently in use, increasing the number of roadways and the number of lanes of each roadway often increases overall road congestion instead of reducing it. Braess's paradox postulates that adding more roads to a road network causes a decrease in overall traffic flow through that network.

One proposed solution to roadway congestion is to remove vehicles from the roadway, such as with vehicles capable of flight. For almost as long as there have been automobiles, there have been attempts to create viable forms of a flying car.

Over the years, vehicle propulsion systems that provide for moving the vehicle along the ground and for moving the vehicle through the air have been developed. Early attempts included converting an automobile into an airplane by attaching wings and some form of air propulsion independent of the wheels. One such example is U.S. Published Patent Application Number 2016/0272314, published Sep. 22, 2016, that discloses a vehicle with wheels and extensible wings and rotors/propellers that can be folded under the wings and that extend into a deployed position.

Other propulsion systems have attempted to make for a more compact configuration. For example, U.S. Pat. No. 9,364,766, issued Jun. 14, 2016, combines a wheel with a perpendicular propeller or rotor. Another example is U.S. Pat. No. 9,598,171, issued Mar. 21, 2017, which discloses a combination rotor and wheel assembly that includes a rotor with a rotor drive located outside the plane of the rotor. Yet another example is U.S. Published Patent Application Number 2018/0281537, published Oct. 4, 2018, that discloses a wheel in which the fan blades are spokes that extend to the wheel rim. The wheel motors are located on inboard side of the wheels.

BRIEF SUMMARY

One or more motive devices providing locomotion for a vehicle is disclosed. The motive device includes a prime mover integrated with one or more drivers. The prime mover converts electrical energy into mechanical energy and the drivers convert the mechanical energy into locomotive force. The prime mover includes at least one electric motor, such as a brushless dc electric motor with an outrunner configuration. The drivers are directly attached to the prime mover and include one or more of a ground driver and/or a fan driver.

According to one embodiment of the present invention, a motive device includes a prime mover integrated with multiple drivers for multimodal locomotion. The motive device is movable between a ground configuration for land-based locomotion via the ground driver and a fan configuration for air-based locomotion via the fan driver.

The ground driver is operable for land travel when the motive device is in the ground configuration. The fan driver is operable for air-based travel by providing lift and flight when the motive device is in a fan configuration. In one embodiment, the motive device includes both a ground driver and a fan driver. In various such embodiments, the ground driver includes one or more sets of spokes and the fan driver includes one or more sets of blades with both the spokes and blades disposed between the prime mover and the rim supporting the wheel. In another embodiment, the motive device includes only a ground driver that is for land travel exclusively.

The ground driver includes a wheel and tire. The wheel includes one or more sets of spokes attached to a rim. The tire is mounted to the rim. The prime mover is connected to the rim via one or more sets of spokes. The prime mover engages the ground driver for land travel with the tire rolling on the ground, thereby propelling the vehicle.

The fan driver includes at least one set of blades that rotate within the rim, which serves as a duct. In one embodiment, there are two sets of blades with one set of blades contra-rotating relative to the other set of blades. In one embodiment, the blades are bounded by a set of spokes proximate the intake and a set of spokes proximate the exhaust. In one such embodiment, the spokes extend inward from the rim. In another embodiment, the fan includes a single set of blades and the set of spokes proximate the exhaust have an extended airfoil shape configured to straighten the exhausted air and reduce turbulence.

The prime mover includes one or more prime mover motors. Each prime mover motor is a brushless dc motor with multiple windings attached to an axle circumferentially. The axle has a conduit that carries electrical conductors connected to the one or more motors in the prime mover. The electrical conductors are connected to a motor controller connected to a power supply.

In one embodiment, each set of spokes and blades is rotated by a corresponding prime mover motor. In this way the spokes and each set of blades is able to be independently and separately operated and controlled. In another embodiment, at least one set of spokes and at least one set of blades share a single prime mover motor that is moved into an operable position corresponding to which of the spokes or blades are to be rotated.

BRIEF DESCRIPTION OF THE SEVERAL VIEWS OF THE DRAWINGS

The above-mentioned features will become more clearly understood from the following detailed description read together with the drawings in which:

The above-mentioned features will become more clearly understood from the following detailed description read together with the drawings in which:

FIG. 1 is a perspective view of two positions for one embodiment of a motive device.

FIG. 2 is a front view of two positions for one embodiment of a motive device.

FIG. 5 is a partial cross-sectional view of one embodiment of a motive device.

FIG. 6 is a side view of one embodiment of a prime mover with the outer rotor member shown in cross-section.

DETAILED DESCRIPTION

Figure 3:
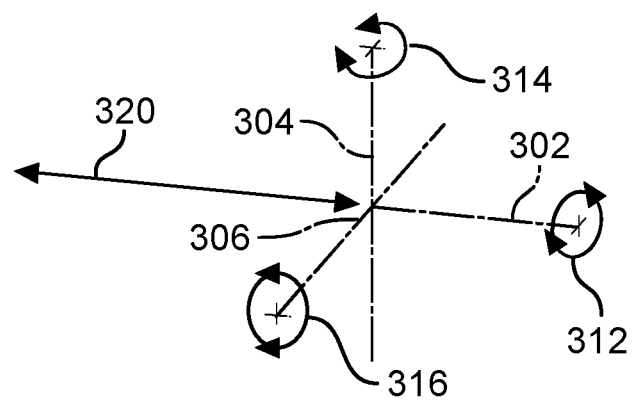
FIG. 3 is a diagram showing the degrees of freedom of a motive device.

Apparatus for a motive device 100 having a combined prime mover 502 and driver 504 is disclosed. The motive device is generally indicated as 100. Various components are illustrated both generically and specifically in the figures and in the following description. For example, the motive device 100-A, 100-B, 100-C are discussed individually and separately to ensure clarity when describing the specific embodiments. The motive device 100, when referred to collectively, is referenced without an alphanumeric suffix. The motive device 100 is movable between two positions, with each position identified by an alphabetic suffice, for example the ground position or configuration 100-G and the fan position or configuration 100-F.

FIG. 1 illustrates a perspective view of two positions 100-G, 100-F for one embodiment of a motive device 100-A. FIG. 2 illustrates a front view of two positions for a motive device 100. The motive device 100 includes a tire 104 mounted on a rim 112 of a wheel 102. In one embodiment, the tire 104 has a low profile. The wheel 102 includes multiple spokes 110 radiating from the hub or center cap 106. The motive device 100 is attached to a vehicle 222 with a support member 120.

The motive device 100 has an axle 202 extending from the inboard or exhaust side 212. The axle 202 does not rotate. The axle 202 is connected to a joint 220 that is attached to a support member 120. The support member is attached to a vehicle 222, for example an automobile, truck, or drone. Skids or struts 224 retractably extend from the bottom of the vehicle 222. The skids 224 are configured to extend to the ground 124 and raise the vehicle 222 such that the motive device 100 is above the ground 124 when in the ground configuration 100-G. When the vehicle 222 is in flight, the skids 224 are retractable to reduce wind resistance.

The motive device 100 operates in multiple modes. The first mode 100-G is for land travel with the motive device 100 positioned with the tire 104 in contact with the ground 124. In the ground-based configuration 100-G, the motive device 100 is similar to a wheel and tire on a conventional, ground-based vehicle where the conventional wheel and tire are the drivers for the vehicle. In the illustrated embodiment, the wheel 102 includes a rim 112 and spokes 110. The spokes 110 support the rim 112. The tire 104 is mounted on the rim 112. And the tire 104 is in contact with the ground 124, such as a road. With the ground configuration 100-G, the motive device 100-A supports the vehicle 222 on the ground 124 while also serving to propel and steer the vehicle 222 for land travel.

The second mode 100-F is with the motive device 100 configured with the wheel 102 and tire 104 positioned non-vertically such that the motive device 100 provides lift, such as for vertical takeoff and flight. In the fan-based or flying configuration 100-F, the motive device 100 operates as a fan with an intake 210 on the upper side and an exhaust 212 on the lower side, relative to the ground 124. Intake air 204-I is pulled into the intake 210 and outlet air 204-O exits the exhaust 212. In the illustrated embodiment, the motive device 100 is rotated such that the outer part of the wheel 102 is positioned facing upward with the intake 210 on top. The outer part of the wheel 102 is the side with the hub cap 106. In another embodiment, the motive device 100 is rotated such that the outer part of the wheel 102 is positioned downward. In such a configuration, the intake 210 is on the side facing upward, which is the inner part of the wheel 102.

In the embodiment illustrated in FIGS. 1 & 2, the hub cap 106 has a cone shape that aids in the flow of the intake air 204-I into the intake 210. In the fan configuration 100-F the axle 202 is moved from the substantially horizontal position of the ground-based configuration 100-G to the non-horizontal position of the fan configuration 100-F. In one embodiment, the support member 120 moves the joint 220 laterally away from the vehicle 222, such as to accommodate the motive device 100 clearing a fender or the vehicle's body when in the fan configuration 100-F. In an embodiment where the motive device 100 is sufficiently distant from the vehicle 222 to move into the fan configuration 100-F without interference, the support member 120 holds the joint 220 in a stationary position without requiring lateral motion 320.

FIG. 3 illustrates a diagram showing the degrees of freedom of a motive device 100 such as illustrated in FIGS. 1 & 2. The motive device 100 has three rotational axes 302, 304, 306. The three rotational axes 302, 304, 306 define three degrees of freedom of the motive device 100. The motive device 100 also moves in the lateral direction 320 when the device 100 moves between the ground configuration 100-G and the fan configuration 100-F. FIG. 3 shows the three rotational axes 302, 304, 306 intersecting at one point. In other embodiments, one or more of the three rotational axes 302, 304, 306 are offset from the other axes 302, 304, 306, that is, the axes 302, 304, 306 do not all intersect at one point.

With the motive device 100 in the ground configuration 100-G, the first rotational axis 302 corresponds to the longitudinal axis of the axle 202, which is substantially parallel with the ground 124. The tire 104 is free to rotate 312 about the first rotational axis 302, which the tire 104 does when the motive device 100 operates to translate the vehicle's position relative to the ground 124. With the motive device 100 in the ground configuration 100-G, the second rotational axis 304 corresponds to a vertical axis substantially perpendicular to the ground 124. The second axis 304, in one embodiment, passes through the joint 220. In another embodiment, the second axis 304 is defined by a steering mechanism attached to the axle 202. The rotation 314 about the second axis 304 allows for the motive device 100 to be used to steer the vehicle 222 by rotating the motive device 100. Also, for the case where the motive device 100 has a toe-in adjustment for tracking, the motive device 100 is rotated 314 the desired amount and the motive device 100 is then held in that fixed toe-in position unless the vehicle 222 is being turned. With the motive device 100 in the ground configuration 100-G, the third rotational axis 306 corresponds to a horizontal axis substantially parallel to the ground 124. The second axis 304, in one embodiment, passes through the joint 220. In another embodiment, the second axis 304 is defined by a steering mechanism attached to the axle 202. The rotation 316 about the third axis 306 allows for a camber angle of the motive device 100 to be set when the device 100 is in the ground configuration 100-G.

With the motive device 100 in the fan configuration 100-F, the first rotational axis 302 corresponds to the longitudinal axis of the axle 202, which has been rotated 316 such that the axle 202 is in a non-horizontal position, that is, the axle 202 is not parallel with the ground 124.

With the motive device 100 in the fan configuration 100-F, the second rotational axis 304 corresponds to the fore-and-aft tilt of the motive device 100. With a forward tilt, the motive device 100 directs the outlet air 204-O to the rear, thereby propelling the vehicle 222 forward. With an aft or rearward tilt, the motive device 100 directs the outlet air 204-O to the front, thereby propelling the vehicle 222 backwards.

With the motive device 100 in the fan configuration 100-F, the third rotational axis 306 corresponds to the lateral tilt of the motive device 100. FIG. 2 illustrates the motive device 100 in the fan configuration 100-F where there is zero lateral tilt, that is, the portion of the motive device 100 closest to the vehicle 222 is at the same elevation as the portion furthest away from the vehicle 222. When the motive device 100 is rotated about the axis 306 there is then lateral tilt with the outlet air 204-O directed to move the vehicle 222 laterally.

A fourth degree of freedom is the linear motion 320 of the motive device 100 relative to the vehicle 222. The linear motion 320 is parallel to the support member 120. The linear motion 320 moves the motive device 100 away from the vehicle 222 for the case where a fender or the vehicle 222 will interfere with the motive device 100 when it is in the fan configuration 100-F or transitioning to the fan configuration 100-F.

Figure 4:
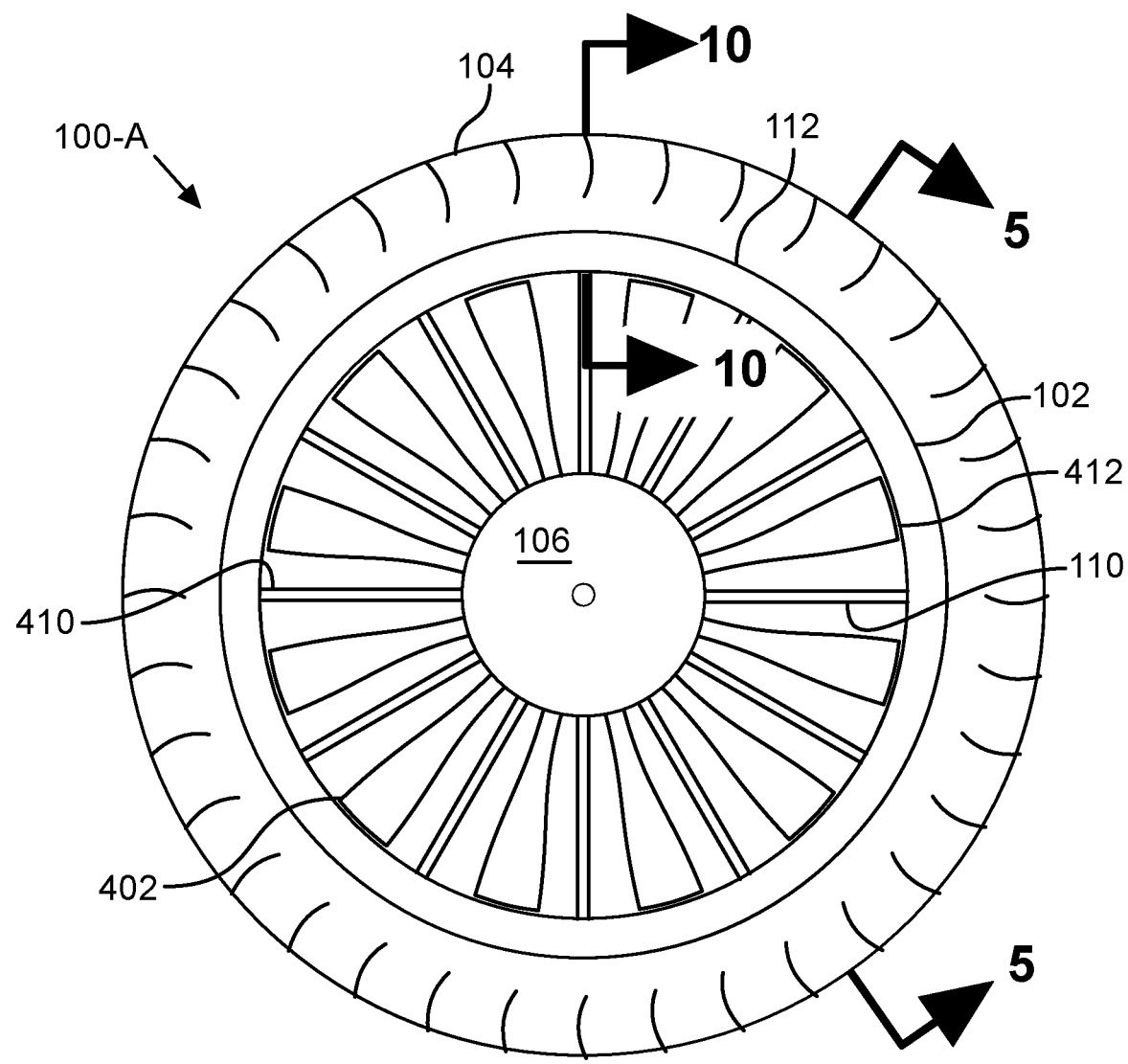
FIG. 4 is an intake-side view showing one embodiment of a motive device.

FIG. 4 illustrates an intake-side view showing one embodiment of a motive device 100-A. The motive device 100-A includes a wheel 102 and a tire 104. The wheel 102 includes spokes 110 and a rim 112. The rim 112 is configured to receive and secure the tire 104. In the center of the wheel 102 and extending from the intake 210 is a hub cap 106. In the illustrated embodiment, the motive device 100-A has twelve spokes 110. Those skilled in the art will recognize that the number of spokes 110 can vary without departing from the spirit and scope of the present invention. The distal end 410 of the spokes 110 are attached to the rim 112. The proximal end of the spokes 110 are attached to the prime mover 502.

In the illustrated embodiment, twelve blades 402 are visible with each blade 402 positioned between a pair of spokes 110. Those skilled in the art will recognize that the number of blades 402 can vary without departing from the spirit and scope of the present invention. The blades 402 extend toward the rim 112 but do not contact the rim 112. There is a gap 412 between each blade 402 and the inside surface of the rim 112. In one embodiment, the gap 412 is between 0.25 and 0.5 mm. The proximal end of the blades 402 are attached to the prime mover 502.

FIG. 5 illustrates a partial cross-sectional view of one embodiment of a motive device 100-A. FIG. 5 illustrates the tire 104 and rim 112, along with a pair of spokes 110-o, 110-i and a pair of blades 402-o, 402-i in cross-section. Also, for illustration purposes, the spokes 110 and blades 402 are shown in-line and not offset as illustrated in FIG. 4. The relative position of the two sets of spokes 110-o, 110-i to each other are fixed because of their attachment to the rim 112. In the illustrated embodiment, the two sets of spokes 110-o, 110-i are in-line between the intake 210 and the exhaust 212. In other embodiments, the two sets of spokes 110-o, 110-i are off-set between the intake 210 and the exhaust 212, that is, the two sets of spokes 110-o, 110-i are not in-line. The relative position of the pair of spokes 110-o, 110-i to each of the sets of blades 402-o, 402-i is not fixed and will vary depending upon the resting position of the rotors 506-Wo, 506-Fo, 506-Fi.

As used herein, the suffix "o" designates outer or outboard and the suffix "i" designates inner or inboard with respect to the position of the component relative to the motive device 100 as attached to the vehicle 222. For example, the outer set of spokes 110-o are positioned proximate the outer side of the motive device 100-A. The hub cap 106 is on the outer side of the motive device 100-A. In the illustrated embodiment, the outer side is where the intake 210 is located and the intake air 204-I is pulled in. The inner set of spokes 110-i are positioned proximate the inner side of the motive device 100-A, which is the side closest to the vehicle 222. The inner side of the motive device 100-A is the side from which the axle 202 protrudes. In the illustrated embodiment, the inner side is where the exhaust 212 is located and the outlet air 204-O exits.

The motive device 100-A includes a prime mover 502 and a driver 504. The prime mover 502 is illustrated between the hub cap 106 and a distal end of the axle 202. The illustrated prime mover 502 has four outer, cylindrical rotors 506 to which the spokes 110 and the blades 402 are operatively attached or connected. Operatively attached or connected means that the spokes 110 and the blades 402 are connected to the rotors 506 such that the spokes 110 and the blades 402 rotate when the corresponding rotor 506 rotates, that is, the spokes 110 and the blades 402 operate in conjunction with their corresponding rotor 506. In one embodiment, the spokes 110 and/or the blades 402 are attached directly to their corresponding rotor 506. In another embodiment, the spokes 110 and/or the blades 402 are connected to the corresponding rotor 506 by way of one or more intervening members. The prime mover 502 also includes the axle 202 that defines a conduit 522 that carries the conductors 552 that power the prime mover 502.

The driver 504 converts the mechanical energy from the prime mover 502 to locomotive force to propel the vehicle 222 on the ground 124 when in the ground configuration 100-G and in the air when in the fan configuration 100-F. The driver 504 includes a ground driver 504-G and a fan driver 504-F. The ground driver includes the wheel 102 that includes two sets of spokes 110-o, 110-i and the rim 110, and the tire 104. The fan driver 504-F includes a pair of blades 402-o, 402-i and the rim 112, which acts as a duct.

The ground driver 504-G includes an outer set of spokes 110-o and an inner set of spokes 110-i, each set with one end 510 attached to a rotor 506 of the prime mover 502 and the other end 410 attached to the inside surface of the rim 112. In the illustrated embodiment, the spokes 110-o, 110-i are configured to provide a minimal profile to the flow of the intake air 204-I and the outlet air 204-O. That is, the spokes 110-o, 110-i are oriented such that the narrowest portion is in-line or parallel with the first axis 302 of rotation. In another embodiment, such as an embodiment with only one set of blades 402, the inside spokes 110-*i* are shaped and oriented to redirect the outlet air 204-O to decrease turbulence and increase efficiency of the fan 504-F when the motive device 100-A is operated in the fan configuration 100-F.

The fan driver 504-F includes a set of outer blades 402-*o*, a set of inner blades 402-*i*, and the rim 112. The two sets of blades 402-*o*, 402-*i* have their proximal end 514 attached to the rotor 506 of the prime mover 502. The blades 402-*o*, 402-*i* have a shape configured to efficiently draw the intake air 204-I through the fan 504-F when the blades 402 rotate within the rim 112. In the illustrated embodiment, the outer blades 402-*o* have a twist and rotate in an opposite direction as the inner blades 402-I, which has an opposing twist. The fan 504-F with the blades 402-*o*, 402-*i* in combination with the inside surface of the rim 112, defines a ducted fan. In the illustrated embodiment, the leading edge 512 of the rim 112 is curved to increase the volume of intake air 204-I. The conical shaped hub or center cap 106 further aids in the flow of the intake air 204-I into the intake 210.

In the illustrated embodiment, the motive device 100 includes two sets of spokes 110-*o*, 110-*i* and two sets of blades 402-*o*, 402-*i*. In other embodiments, the motive device 100 includes a single set of spokes 110. In yet other embodiments, the motive device 100 includes a single set of blades 402. One such embodiment with a single set of blades 402 includes an inboard spoke 110-*i* that has a configuration that aids in straightening out the flow of the outlet air 204-O. In one such embodiment, the inboard spoke 110-*i* is lengthened in the direction of air flow and has an airfoil shape to smooth and redirect the outlet air 204-O.

FIG. 6 illustrates a side view of one embodiment of a prime mover 502 with the outer rotor member 516 shown in cross-section. The prime mover 502 includes a stator 616 and a rotor 506. The illustrated embodiment of the prime mover 502 is a brushless dc electric motor with an outrunner configuration. That is, the rotor 506 spins outside the stator 616.

The rotor 506 includes multiple magnets 604, an outer or cylindrical member 516 that is cylindrical, and a side member 716 that extends from the outer member 516 toward the axle 202.

The stator 616 includes the axle 202 and multiple poles 606. The axle 202 and the poles 606 are stationary and are inside the rotor 506. Each pole 606 includes a winding or coil 602 with a core 612. The core 612 is a magnetizable material that provides a path for the magnetic flux generated by the winding 602. The rotor 506 rotates 312 about the first rotary axis 302. In the illustrated embodiment, there are twelve poles 606 and fourteen magnets 604. Those skilled in the electrical arts will recognize that the number of poles 606 and magnets 604 can vary without departing from the spirit and scope of the present invention.

In the illustrated embodiment, the prime mover 502 is a brushless dc electric motor. In one embodiment, the magnets 604 are rare-earth magnets, such as neodymium magnets. In the illustrated embodiment, the magnets 604 protrude from the inside surface of the cylindrical member 516 of the rotor 506. The distal ends of the poles 606 follow a circular path during operation. The circular path of the distal ends of the poles 606 define a stator outer diameter that is slightly less than the inside rotor diameter defined by the inside surface of the magnets 604. In such an embodiment, the movement of the poles 606 past the protruding magnets 604 create turbulence around the poles 606 as the magnets 604 move past the poles 606, and such turbulence aids in circulating cooling air around the windings 602 to cool the windings 602. In another embodiment, the magnets 604 are flush mounted so as to minimize air turbulence and any loss of efficiency. In such an embodiment, the prime mover 502 is cooled by a cooling fan attached to the rotor 506 that directs cooling air over the poles 606 and/or a cooling fan otherwise positioned to provide cooling.

The electrical connections to the stator windings 602 are made through the axle 202. The axle 202 is a hollow cylinder that is both a conduit 522 for the wiring or conductors 552 connected to the windings 602 and a support for the windings 602.

Figure 7:
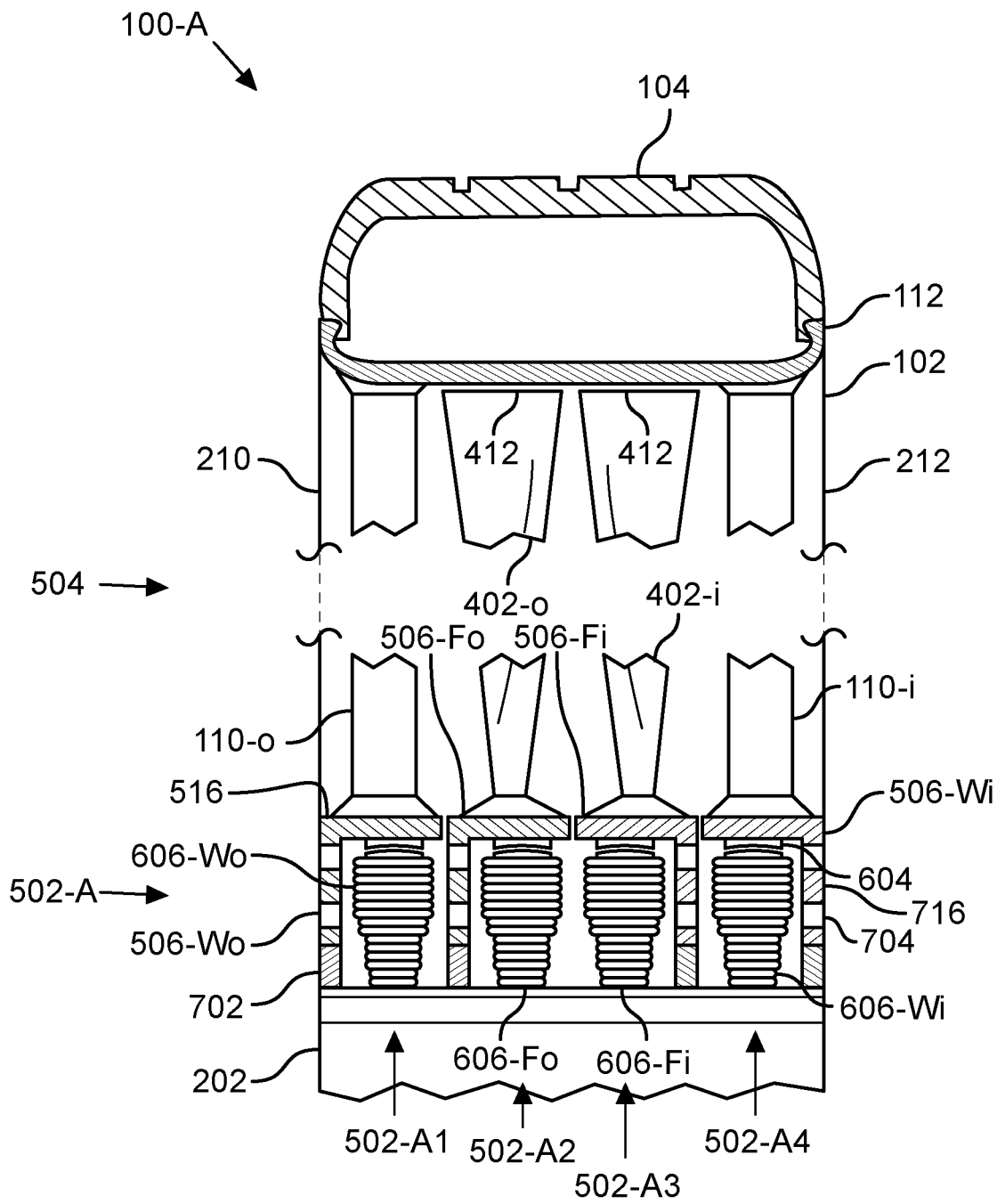
FIG. 7 is a partial cross-sectional view of one embodiment of a motive device.

FIG. 7 illustrates a partial cross-sectional view of one embodiment of a motive device 100-A. The motive device 100-A includes a full-width tire 104, that is, the tire 104 extends from the outboard side (or intake) 210 to the inboard side (or exhaust) 212 of the wheel 102. The illustrated embodiment of the prime mover 502-A includes the axle 202 and four prime mover motors 502-A1, 502-A2, 502-A3, 502-A4. Each prime mover motor 502-A1, 502-A2, 502-A3, 502-A4 includes a set of poles 606-Wo, 606-Fo, 606-Fi, 606-Wi, and a set of rotors 506-Wo, 506-Fo, 506-Fi, 506-Wi. There are four sets of windings 602-Wo, 602-Fo, 602-Fi, 602-Wi, each set associated with one set of poles 606-Wo, 606-Fo, 606-Fi, 606-Wi. There are four rotors 506-Wo, 506-Fo, 506-Fi, 506-Wi, each associated with one set of poles 606-Wo, 606-Fo, 606-Fi, 606-Wi.

The rotors 506-Wo, 506-Fo, 506-Fi, 506-Wi have bearings 702 that allow independent rotation of the rotors 506 about the axle 202. Each rotor 506 has an outer or cylindrical member 516 associated with one set of poles 606-Wo, 606-Fo, 606-Fi, 606-Wi. Each rotor 506 has a side member 716 that extends from each outer member 516 toward the axle 202. In this way, each of the spokes 110-*o*, 110-*i* and each of the blades 402-*o*, 402-*i* are driven individually and separately by the prime mover 502-A. That is, the prime mover 502-A includes four motors 502-A1, 502-A2, 502-A3, 502-A4.

The prime mover 502-A includes the first prime mover motor 502-A1 and the fourth prime mover motor 502-A4 that work in conjunction when in the ground configuration 100-G. That is, both motors 502-A1, 502-A4 are powered at the same time and at the same speed because the distal ends 410 of the spokes 110-*o*, 110-*i* are attached to the rim 112.

The first prime mover motor 502-A1 includes a set of outboard poles 606-Wo attached to the axle 202. The motor 502-A1 includes a bearing 702 between the axle 202 and the rotor 506-Wo. In one embodiment, the bearing 702 is a thrust bearing that maintains alignment of the rotor 506 with the axle 202 while also allowing the rotor 506 to rotate about the axle 202. The motor 502-A1 also includes a set of magnets 604 positioned between the outboard end of the poles 606-Wo and the inside surface of the rotor 506-Wo. The ground driver 504-G includes the set of spokes 110-*o* that have the proximal end attached to the outside surface of the rotor 506-Wo and the distal end attached to the inside surface of the rim 112. In this way the first prime mover motor 502-A1 causes the ground driver 504-G to rotate with the bearing 702 supporting the rotor 506-Wo and the ground driver 504-G.

The fourth prime mover motor 502-A4 includes a set of inboard poles 606-Wi attached to the axle 202. The motor 502-A4 includes a bearing 702 between the axle 202 and the rotor 506-Wi. The motor 502-A4 also includes a set of magnets 604 positioned between the outboard end of the poles 606-Wi and the inside surface of the rotor 506-Wi. The ground driver 504-G includes the set of spokes 110-*i* that have the proximal end attached to the outside surface of the rotor 506-Wi and the distal end attached to the inside surface of the rim 112. In this way the first prime mover motor 502-A4 causes the ground driver 504-G to rotate with the bearing 702 supporting the rotor 506-Wi and the ground driver 504-G.

The prime mover 502-A also includes the second prime mover motor 502-A2 and third prime mover motor 502-A3 that work in conjunction when in the fan configuration 100-F. That is, in one embodiment, both motors 502-A2, 502-A3 are powered at the same time and at the same speed. In one embodiment, the second prime mover motor 502-A2 rotates in the opposite direction as the third prime mover motor 502-A3. In another embodiment, the second prime mover motor 502-A2 rotates in the same direction as the third prime mover motor 502-A3.

The second prime mover motor 502-A2 includes a set of outboard fan poles 606-Fo attached to the axle 202. The motor 502-A2 includes a bearing 702 between the axle 202 and the rotor 506-Fo. The motor 502-A2 also includes a set of magnets 604 positioned between the outboard end of the poles 606-Fo and the inside surface of the rotor 506-Fo.

The fan driver 504-F includes the set of blades 402-*o* that have the proximal end 514 attached to the outside surface of the rotor 506-Fo and the opposite, distal end extending toward, but not contacting, the inside surface of the rim 112. In this way the second prime mover motor 502-A2 causes the outboard half of the fan driver 504-F to rotate with the bearing 702 supporting the rotor 506-Fo and the fan driver 504-F.

The third prime mover motor 502-A3 includes a set of inboard fan poles 606-Fi attached to the axle 202. The motor 502-A3 includes a bearing 702 between the axle 202 and the rotor 506-Fi. The motor 502-A3 also includes a set of magnets 604 positioned between the outboard end of the poles 606-Fi and the inside surface of the rotor 506-Fi. The fan driver 504-F includes the set of blades 402-*i* that have the proximal end 514 attached to the outside surface of the rotor 506-Fi and the opposite, distal end extending toward, but not contacting, the inside surface of the rim 112. In this way the third prime mover motor 502-A3 causes the inboard half of the fan driver 504-F to rotate with the bearing 702 supporting the rotor 506-Fi and the fan driver 504-F.

In the illustrated embodiment, the rotors 506 include vents 704 on the side walls. In another embodiment, vents 704 are positioned on the cylindrical portion of the rotors 506. The vents 704 are positioned so as to allow air to flow around and past the windings 602 to remove excess heat from the windings 602. In one embodiment, the prime mover 502 is cooled by a cooling fan driven by one of the rotors 506 such that the cooling fan directs cooling air through the various vents 704 so that cooling air flows over and around the poles 606. In another embodiment, the prime mover 502 is cooled by a cooling fan otherwise positioned to provide cooling.

Figure 8:
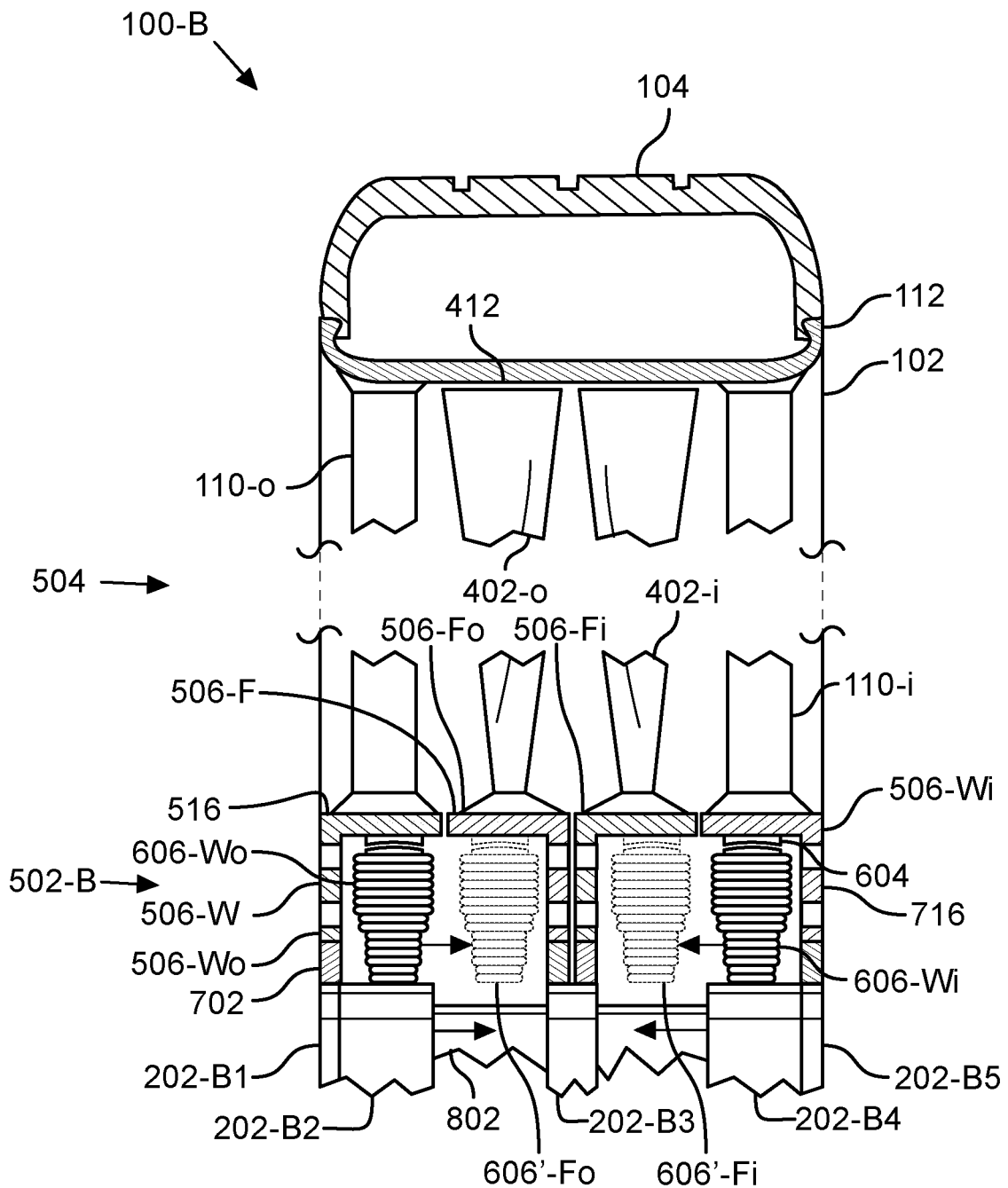
FIG. 8 is a partial cross-sectional view of a second embodiment of a motive device.

FIG. 8 illustrates a partial cross-sectional view of a second embodiment of a motive device 100-B. The motive device 100-B includes a full-width tire 104, that is, the tire 104 extends from the outboard side to the inboard side of the wheel 102. The prime mover 502-B includes two motors 502-B1, 502-B2. In the illustrated embodiment, the set of poles 606-Wo, 606-Wi for the motors 502-B1, 502-B2 are movable between the positions corresponding to the rotors 506-W, 506-F for the ground driver 504-G and the fan driver 504-F.

The prime mover 502-B includes the axle 202, two sets of poles 606-Wo, 606-Wi, bearings 702 and four rotors 506-Wo, 506-Fo, 506-Fi, 506-Wi. The axle 202 includes two sections 202-B2, 202-B4 that are movable over a fixed member 802. The axle 202 includes three sections 202-B1, 202-B3, 202-B5 that are fixed in place and support the bearings 702 for the rotors 506-Wo, 506-Fo, 506-Fi, 506-Wi.

The first movable axle 202-B2 has the set of poles 606-Wo attached to it. The movable axle 202-B2 is slideable on the fixed member 802 such that the poles 606-Wo are in one of two positions. The first position is with the poles 606-Wo engaging the magnets 604 on the first rotor 506-Wo. The second position is with the poles 606-Wo engaging the magnets 604 on the second rotor 506-Fo. The first set of poles 606-Wo is movable to where the second set of poles 606'-Fo is illustrated with dashed lines in FIG. 8. The first and second rotors 506-Wo, 506-Fo are configured such that there is a clear path for the set of poles 606-Wo to slide therebetween.

The second movable axle 202-B4 has a set of poles 606-Wi attached to it. The movable axle 202-B4 is slideable on the fixed member 802 such that the poles 606-Wi are in one of two positions. The first position is with the poles 606-Wi engaging the magnets 604 on the fourth rotor 506-Wi. The second position is with the poles 606-Wi engaging the magnets 604 on the third rotor 506-Fi. The inboard set of poles 606-Wi is movable to where the third poles 606'-Fi is illustrated with dashed lines in FIG. 8. The fourth and third rotors 506-Wi, 506-Fi are configured such that there is a clear path for the set of poles 606-Wi to slide therebetween.

With the movable axles 202-B2, 202-B4 both in their respective first position, the prime mover 502-B is configured for the motive device 100-B to operate in the ground configuration 100-G. That is, the ground driver 504-G is operable to roll the motive device 100-B on the ground 124. With the movable axles 202-B2, 202-B4 both in their respective second position, the prime mover 502-B is configured for the motive device 100-B to operate in the fan configuration 100-G. That is, the fan driver 504-F is operable to draw in the intake air 204-I.

Figure 9:
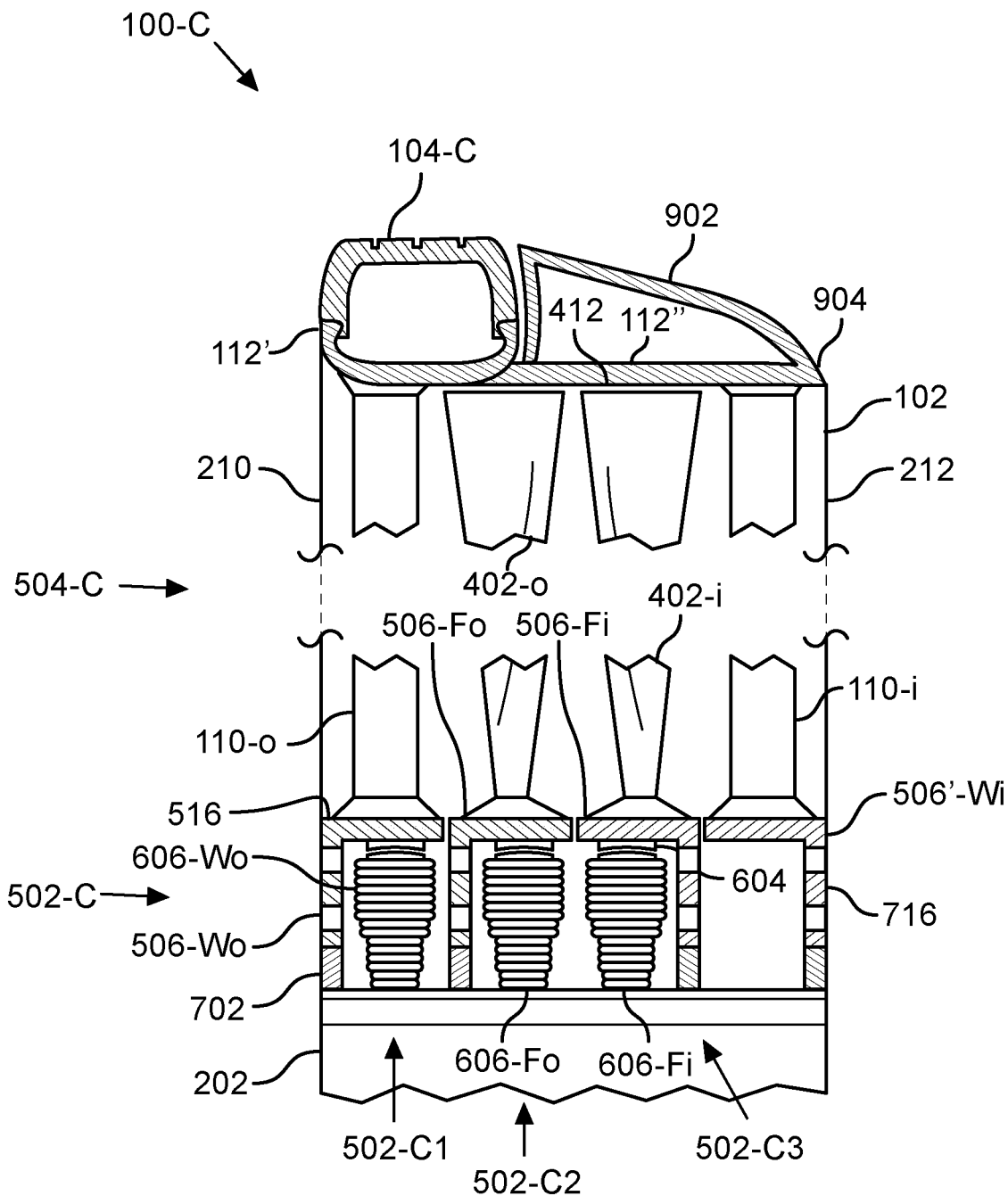
FIG. 9 is a partial cross-sectional view of a third embodiment of a motive device.

FIG. 9 illustrates a partial cross-sectional view of a third embodiment of a motive device 100-C. In the illustrated embodiment, the motive device 100-C has an extended duct defined by the extended rim 112, 112' between the intake 210 and the exhaust 212 as compared to the embodiments illustrated in FIGS. 7 & 8.

The motive device 100-C includes a tire 104-C that extends partially from the outboard side 210 toward the inboard side 212 of the wheel 102. The wheel 102 includes a first rim 112' sized to receive the tire 104-C and a secondary rim 112" that supports an airfoil 902 that tapers from the outermost surface of the tire 104-C to an edge 904 that is opposite the tire 104-C. In one embodiment, the airfoil 902 is a resilient material, for example, a polymer similar to that used for the tire 104-C. The secondary rim 112" is a rigid material like the tire rim 112'. Both rims 112', 112" are a material suitable to withstand the rotational demands for both the ground configuration 100-G and the fan configuration 100-F.

In the illustrated embodiment, the outboard spoke 110-*o* is attached to the first rim 112' supporting the tire 104-C. The inboard spoke 110-*i* is attached to the secondary rim 112". The sets of blades 402-*o*, 402-*i* are disposed between the outboard and inboard spokes 110-*o*, 110-*i*.

In the illustrated embodiment, the ground drive 504-G is powered by the first prime mover motor 502-C1. The fan drive 504-F is powered by the second and third prime mover motors 502-C2, 502-C3. The illustrated fourth rotor 506'-Wi has no associated windings 506-Wi nor magnets 604.

Figure 10:
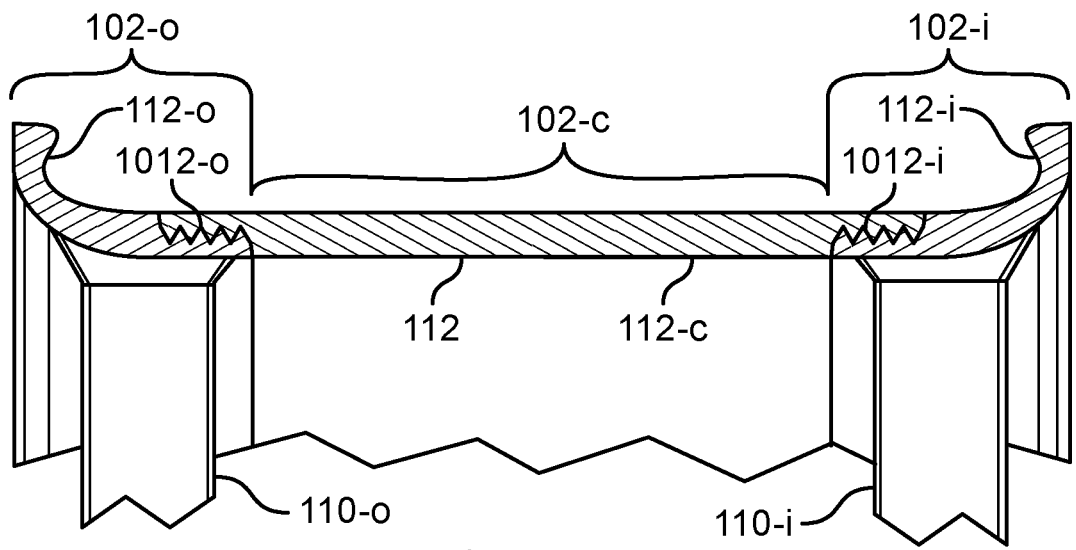
FIG. 10 is a partial cross-sectional view of one embodiment of a rim.

FIG. 10 illustrates a partial cross-sectional view of one embodiment of a wheel 102 with a rim 112 and spokes 110. For illustration purposes, the spokes 110 are not shown in cross-section.

The rim 112 includes three sections, including an outboard rim section 112-*o*, a central rim collar 112-*c*, and an inboard rim section 112-*i*. The outboard rim section 112-*o* is joined to the central collar 112-*c* with a threaded connection 1012-*o*. The threaded connection 1012-*o* extends around the circumference of the outboard section 112-*o* and the central collar 112-*c*. The inboard rim section 112-*i* is joined to the central collar 112-*c* with a threaded connection 1012-*i*. The threaded connection 1012-*i* extends around the circumference of the inboard section 112-*i* and the central collar 112-*c*.

The wheel 102 includes the rim 112 and the spokes 110. Accordingly, in the illustrated embodiment, the wheel 102 is made of three sections 102-*o*, 102-*c*, 102-*i*. The first section 102-*o* of the wheel 102 includes the outboard rim section 112-*o* with the distal end of the outboard spokes 110-*o* attached to the outboard rim section 112-*o*. The first section of the wheel 102 has the proximal end of the outboard spokes 110-*o* attached to the rotor 506-Wo. The second section 102-*c* of the wheel 102 includes the central collar 112-*c*. The third section 102-*i* of the wheel 102 includes the inboard rim section 112-*i* with the distal end of the inboard spokes 110-*i* attached to the inboard rim section 112-*i*. The third section 102-*i* of the wheel 102 has the proximal end of the inboard spokes 110-*i* attached to the rotor 506-Wi.

The motive device 100 is assembled by first positioning the third, inboard section 102-*i* of the wheel 102 with the rotor section 506-Wi positioned proximate the windings 602-Wi. The center wheel section 102-*c* is joined to the inboard wheel section 102-*i* by engaging the threaded connection 1012-*i*. The rotor sections 506-Fi, 506-Fo, with the corresponding blades 402-*i*, 402-*o* attached, are positioned proximate the windings 602-Fi, 602-Fo respectively. Then the outboard wheel section 102-*o* is screwed onto the center wheel section 102-*c*. In this way the motive device 100 is readily assembled with the blades 402 positioned between the spokes 110-*o*, 110-*i*.

Figure 11:
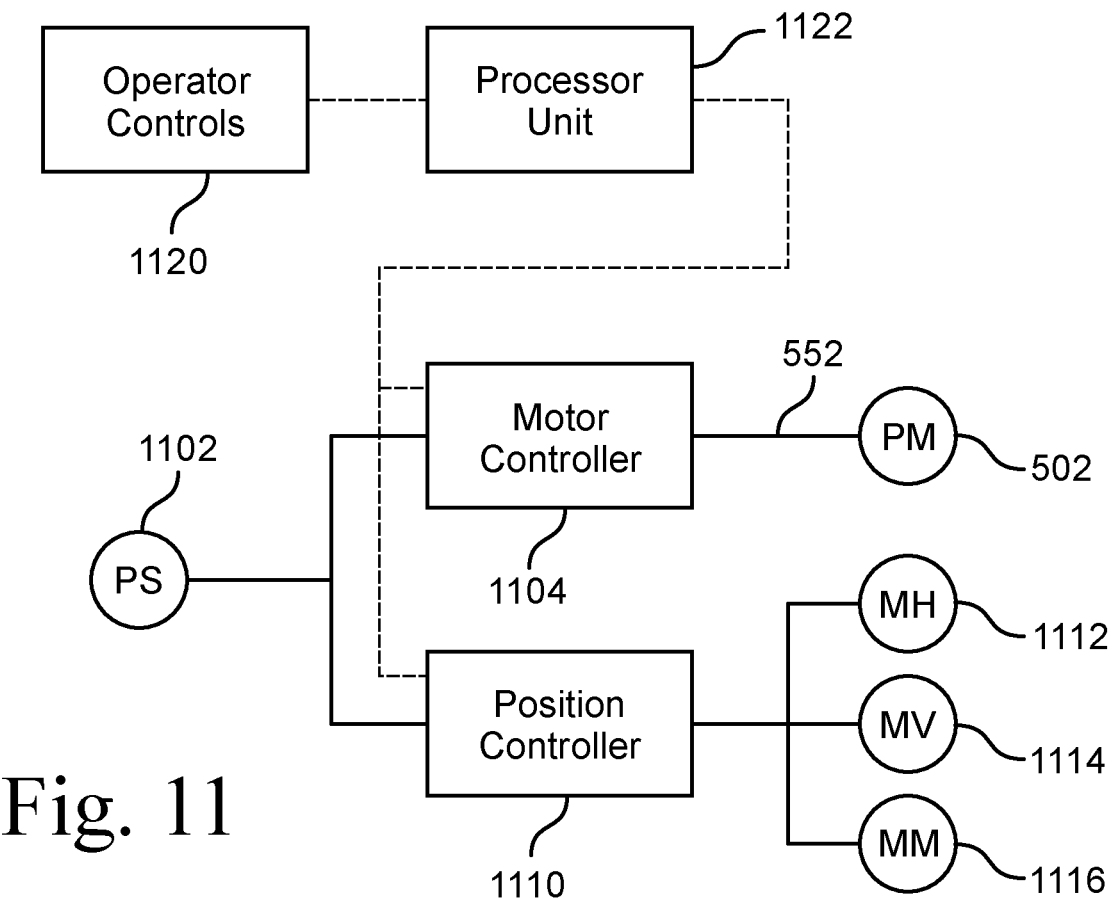
FIG. 11 is a functional block diagram of one embodiment of a motive device.

FIG. 11 illustrates one embodiment of a functional block diagram of the electrical control and power system for a motive device 100. The vehicle 222 includes a power supply (PS) 1102, such as a battery or other electrical power generator. The power supply 1102 provides electrical energy to the motor controller 1104 and the position controller 1110. The motor controller 1104 controls the electrical energy to the prime mover 502. The conductors 552 connect the motor controller 1104 to the windings 602 of the prime mover 502. In one embodiment, the motor controller 1104 operatively powers and controls the four prime mover motors 502-A1, 502-A2, 502-A3, 502-A4. In one embodiment, the motor controller 1104 includes an electronic servo system with semiconductor switches controlling the delivery of power to the individual stator windings 602 to cause the appropriate prime mover motors 502 to rotate.

The position controller 1110 controls the position of the motive device 100 relative to the axes 302, 304, 306. The position controller 1110 operatively powers and controls the electrical energy to the motor or device (MH) 1112 that causes rotation 314 about the second rotary axis 304. The position controller 1110 controls the electrical energy to the motor or device (MV) 1114 that causes rotation 316 about the third rotary axis 306. The position controller 1110 controls the electrical energy to the motor or device (MM) 1116 that moves 320 the motive device 100 between the two modes or configurations 100-G, 100-F in the horizontal axis 302. In one embodiment, the position controller 1110 causes the movable axle sections 202-B2, 202-B4 to slide between the ground and fan configurations 100-G, 100-F.

A set of operator controls 1120 communicate with a processor unit 1122. The operator controls 1120, in one embodiment, are accessible inside the vehicle 222 by an operator. In another embodiment, such as in the case of a drone or remote controlled vehicle, the operator controls 1020 are remote to the vehicle 222 and the controls 1120 communicate wirelessly with the processor unit 1122.

The processor unit 1122 communicates with the motor controller 1104 and the position controller 1110. The set of operator controls 1120 includes switches and indicators for operation of the vehicle 222 while in the ground configuration 100-G and for the flight control system while in the fan configuration 100-F. The operator controls 1020 includes various functions such as mode selector, speed control, braking, control stick, yoke, and motive device 100 orientation.

The motive device 100 includes various functions. The function of moving from the ground configuration 100-G to the fan configuration 100-F is implemented, in one embodiment and in part, by sliding the movable axle sections 202-B2, 202-B4 such that the windings 602-Wo, 602-Wi align with the magnets 604 on the second and third rotors 506-Fo, 506-Fi, respectively.

The function of moving from the fan configuration 100-F to the ground configuration 100-G is implemented, in one embodiment and in part, by sliding the movable axle sections 202-B2, 202-B4 such that the windings 602-Wo, 602-Wi align with the magnets 604 on the first and fourth rotors 506-Wo, 506-Wi, respectively.

The function of moving the motive device 100 from the fan configuration 100-F to the ground configuration 100-G is implemented, in one embodiment, by rotating the motive device 100 about the third rotational axis 306 such that the intake side 210 is substantially vertical with respect to the ground 124. The joint 220 is configured to allow the axle 202 to pivot at the joint 220 relative to the support member 120.

The function of moving the motive device 100 between the fan configuration 100-F to the ground configuration 100-G is implemented, in one embodiment, by the skid 224 that retractably extends from the bottom of the vehicle 222. The skid 224 extends to the ground 124 and raises the vehicle 222 such that the bottom of the motive device 100 is above the ground 124 so that the motive device 100 is able to be rotated 316 about the third rotational axis 306 free of any encumbrance with the ground 124.

The function of protecting the blades 402 from inadvertent contact is implemented, in one embodiment, by the spokes 110 and the rim 112. In this way the rotating blades 402 do not present a significant safety hazard for nearby pedestrians or other persons and/or animals.

The function of a motive device 100-G enabled for only land travel is implemented, in one embodiment, by the motive device 100 including only spokes 110 connecting the prime mover 502 to the rim 112, where the prime mover 502 includes a sufficient number of poles 606 to accommodate the ground driver 504-G. In such an embodiment, the components associated with the fan 504-F are not included in the motive device 100.

The function of a motive device 100-F enabled for only air travel is implemented, in one embodiment, by the motive device 100 including only fan blades 402 connecting the prime mover 502 to the rim 112, where the prime mover 502 includes a sufficient number of poles 606 to accommodate the fan driver 504-F. In one such embodiment, the components associated only with the ground driver 504-F, such as the wheel 104, are not included in the motive device 100.

The function of aiding the intake air flow 204-I is implemented, in one embodiment, by a leading edge 512 of the rim 112 having a curved shape 512. In one such embodiment, rim 112, in combination with the edges 512 define a venturi. In another embodiment, aiding the intake air flow 204-I is implemented with the conical shaped hub or center cap 106.

The function of assembling the wheel 102 with the sets of blades 402 between the inner and outer spokes 110-i, 110-o is implemented, in one embodiment, by the wheel 102 having three sections 102-o, 102-c, 102-i joined together with a threaded joint 1012-o, 1012-i.

From the foregoing description, it will be recognized by those skilled in the art that a motive device 100 that combines a prime mover 502 with drivers 504 has been provided. The drivers 504, in various embodiments, include a ground driver 504-G and/or a fan driver 504-F.

From the foregoing description, it will be recognized by those skilled in the art that a motive device 100 has been provided. In one embodiment, the motive device 100 is operable in multiple modes, namely, a first mode 100-G for land travel and a second mode 100-F for air travel. Land travel is locomotion with the motive device 100 causing vehicle motion through contact with the ground 124. Air travel is locomotion with the motive device 100 causing vehicle motion by moving air, such as by providing lift. In such a multi-mode embodiment, the motive device 100 includes a combination of a prime mover 502, a ground driver 504-G, and a fan driver 504-F. In various such embodiments as illustrated in FIGS. 5-9, the motive device 100 includes multiple prime movers 502 with each one driving either a set of spokes 110-o, 110-i or a set of fan blades 402-o, 402-i.

In another embodiment, the motive device 100 is operable in a single mode, namely, a mode 100-G for land travel. In such an embodiment, the motive device 100 includes a combination of a prime mover 502 and a ground driver 504-G with no a fan driver 504-F. In one such embodiment, a single rotor 506 causes the blades 402 to rotate in the same direction. In another embodiment, a pair of rotors 506-Fo, 506-Fi, each one attached to on of a pair of sets of blades 402-o, 402-i allow the sets of blades 402-o, 402-i to rotate in opposite directions.

In yet another embodiment, the motive device 100 is operable in a single mode, namely, a mode 100-F for air travel. In such an embodiment, the motive device 100 includes a combination of a prime mover 502 and a fan driver 504-F, without a ground driver 504-G. In one such embodiment, a single rotor 506 causes the wheel 104 to rotate.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for providing locomotion for a vehicle, said apparatus comprising:
    a prime mover including a stator and a plurality of rotors, said stator including an axle and a plurality of poles, each one of said plurality of rotors including a plurality of magnets, an outer member, and a side member, a bearing disposed between said side member and said axle, said axle defining a conduit holding a plurality of conductors, said plurality of conductors each having one end connected to a winding associated with a corresponding one of said plurality of poles, and said plurality of magnets attached to an inside surface of said outer member;
    a first driver operatively connected to at least one of said plurality of rotors, said first driver including a wheel, said wheel including a plurality of spokes and a rim, a distal end of each one of said plurality of spokes attached to said rim, and an opposite end of each one of said plurality of spokes operatively attached to and extending radially from said rotor; and
    a second driver operatively connected to at least one of said plurality of rotors, said second driver including a first set of blades operatively attached to said rotor, said first set of blades extending radially from said rotor, and said first set of blades configured to draw an air stream through said plurality of spokes when said prime mover causes said first set of blades to rotate about said axle.

2. The apparatus of claim 1 wherein said plurality of rotors include a first rotor and a second rotor wherein both said first and second rotors rotate independently about said axle.

3. The apparatus of claim 2 wherein said plurality of poles are selectively movable axially between said first rotor and said second rotor; said first rotor operatively attached to said plurality of spokes; and said second rotor operatively attached to said first set of blades whereby said first driver or said second driver is driven by said plurality of poles.

4. The apparatus of claim 1 wherein said rim includes a first rim section and a second rim section, and said first rim section and said second rim section configured to releasably connect around a circumference of said rim, whereby said rim is separable to allow insertion of said first set of blades into a medial portion of said first driver.

5. The apparatus of claim 1 wherein said plurality of poles include a first and second set of poles, said plurality of rotors include first and second rotors that rotate independently in cooperation with said first and second set of poles, said first set of spokes operatively attached to said first rotor, and said first set of blades operatively attached to said second rotor.

6. The apparatus of claim 1 wherein said plurality of poles include a first, second, and third set of poles, said plurality of rotors include first, second, and third rotors that rotate independently in cooperation with said first, second, and third set of poles, said first set of spokes operatively attached to said first rotor, said first driver including a second set of spokes operatively attached to said third rotor, and said first set of blades operatively attached to said second rotor.

7. The apparatus of claim 1 wherein said plurality of poles include a first, second, and third set of poles, said plurality of rotors include first, second, and third rotors that rotate independently in cooperation with said first, second, and third set of poles, said first set of spokes operatively attached to said first rotor, said first set of blades attached to said second rotor, and said second driver including a second set of blades attached to said third rotor, whereby said first set of blades rotates independently of said second set of blades.

8. The apparatus of claim 1 further including a tire and an airfoil, said tire engaging said rim proximate said plurality of spokes, and said airfoil positioned adjacent said tire and extending toward an inboard side of said rim.

9. The apparatus of claim 1 further including a joint at a distal end of said axle, and said joint configured to move said first driver and said first driver between a ground configuration for land travel and a fan configuration for air-based travel.

10. An apparatus for providing multiple modes of locomotion for a vehicle, said apparatus comprising:
a prime mover including a stator, a first rotor, and a second rotor, said stator including an axle, said stator including a first set of poles extending radially from said axle, said first set of poles cooperating with a first set of magnets associated with a cylindrical portion of said first rotor, said stator including a second set of poles extending radially from said axle, said second set of poles cooperating with a second set of magnets associated with a cylindrical portion of said second rotor, and said first rotor and said second rotor rotate independently about said axle;
a first driver including a first set of spokes operatively connected radially from said first rotor, a distal end of each one of said first set of spokes operatively connected to a rim such that said rim rotates with said first set of spokes; and
a second driver including a first set of blades operatively connected radially from said second rotor, a distal end of each one of said first set of blades extending toward said rim, and said first set of blades configured to draw an air stream through said plurality of spokes when said prime mover causes said first set of blades to rotate about said axle.

11. The apparatus of claim 10 further including a third rotor, said stator including a third set of poles extending radially from said axle, and said third set of poles cooperating with a third set of magnets associated with a cylindrical portion of said third rotor.

12. The apparatus of claim 11 further including a second set of spokes operatively connected radially from said third rotor, and a distal end of each one of said third set of spokes operatively connected to said rim such that said rim rotates with said first and second set of spokes.

13. The apparatus of claim 11 further including a second set of blades operatively connected radially from said third rotor, a distal end of each one of said second set of blades extending toward said rim, and said second set of blades configured to draw an air stream through said plurality of spokes when said prime mover causes said second set of blades to rotate about said axle.

14. The apparatus of claim 11 wherein said third rotor is positioned between said first rotor and said second rotor, said first set of poles being selectively movable axially between said first rotor and said third rotor, a second set of blades operatively connected radially from said third rotor, a distal end of each one of said second set of blades extending toward said rim, and said second set of blades configured to draw an air stream through said first set of spokes when said prime mover causes said set of blades to rotate about said axle whereby said first set of spokes or said second set of blades is driven by said first set of poles.

15. The apparatus of claim 10 wherein said rim includes a first rim section and a second rim section, and said first rim section and said second rim section configured to releasably connect around a circumference of said rim, whereby said rim is joinable after insertion of said second driver into a medial portion of said first driver.

16. The apparatus of claim 10 wherein said axle defines a conduit through which multiple conductors connect to said first set of poles and said second set of poles.

17. An apparatus for providing locomotion for a vehicle, said apparatus comprising:
a prime mover including a stator and a plurality of rotors, said stator including an axle and a plurality of poles, each one of said plurality of rotors including a plurality of magnets, an outer member, and a side member, a bearing disposed between said side member and said axle, said axle defining a conduit holding a plurality of conductors, and said plurality of conductors each having one end connected to a winding associated with a corresponding one of said plurality of poles, said plurality of magnets attached to an inside surface of said outer member; and
a first driver operatively connected to at least one of said plurality of rotors, said first driver including a wheel, said wheel including a plurality of spokes and a rim, a distal end of each one of said plurality of spokes attached to said rim, and an opposite end of each one of said plurality of spokes operatively attached to and extending radially from said rotor.

18. The apparatus of claim 17 further including a second driver operatively connected to at least one of said plurality of rotors, said second driver including a first set of blades operatively attached to said rotor, said first set of blades extending radially from said rotor, and said first set of blades configured to draw an air stream through said plurality of spokes when said prime mover causes said blades to rotate about said axle.

19. The apparatus of claim 18 further including a tire and an airfoil, said tire engaging said rim proximate said plurality of spokes, and said airfoil positioned adjacent said tire and extending toward an inboard side of said rim.

20. The apparatus of claim 18 wherein said rim includes a first rim section and a second rim section, and said first rim section and said second rim section configured to releasably connect around a circumference of said rim, whereby said rim is joinable after insertion of said second driver into a medial portion of said first driver.

* * * * *